US006548155B1

(12) United States Patent
Jaffee

(10) Patent No.: US 6,548,155 B1
(45) Date of Patent: Apr. 15, 2003

(54) FIBER GLASS MAT

(75) Inventor: Alan Michael Jaffee, Bowling Green, OH (US)

(73) Assignee: Johns Manville International, Inc., Denver, CO (US)

( * ) Notice: Subject to any disclaimer, the term of this patent is extended or adjusted under 35 U.S.C. 154(b) by 174 days.

(21) Appl. No.: 09/619,430

(22) Filed: Jul. 19, 2000

(51) Int. Cl.⁷ .................................. B32B 27/12
(52) U.S. Cl. .................. 428/297.4; 428/297.4; 428/426; 428/440
(58) Field of Search .................. 428/297.4, 426, 428/440

(56) References Cited

U.S. PATENT DOCUMENTS

| 4,112,174 A | | 9/1978 | Hannes et al. ............... 428/220 |
| 4,129,674 A | | 12/1978 | Hannes et al. ............... 428/285 |
| 4,289,664 A | * | 9/1981 | Gomez et al. ................. 260/19 |
| 4,430,473 A | * | 2/1984 | Brode et al. ................. 524/492 |
| 4,681,802 A | | 7/1987 | Gaa et al. .................... 428/288 |
| 4,690,860 A | | 9/1987 | Radvan et al. ............... 428/290 |
| 4,729,917 A | | 3/1988 | Symdra et al. .............. 428/190 |
| 4,810,576 A | | 3/1989 | Gaa et al. .................... 428/391 |
| 5,294,682 A | * | 3/1994 | Fukuda et al. ............... 525/442 |
| 5,393,379 A | | 2/1995 | Perrinello .................... 162/101 |
| 5,484,653 A | | 1/1996 | Kennedy et al. ............. 428/290 |
| 5,565,049 A | | 10/1996 | Simmons et al. ........... 156/62.6 |
| 5,772,846 A | | 6/1998 | Jaffee ......................... 162/145 |
| 6,008,147 A | | 12/1999 | Jaffee ......................... 442/331 |

FOREIGN PATENT DOCUMENTS

| EP | 148761 | 7/1985 | ........... B29C/67/14 |
| EP | 148760 | 7/1990 | ........... B29C/67/14 |
| WO | 98/49248 | 11/1998 | ............. C09J/7/00 |

* cited by examiner

*Primary Examiner*—Merrick Dixon
(74) *Attorney, Agent, or Firm*—Robert D. Touslee

(57) ABSTRACT

A fiber glass mat containing a novolac resin having an acid solubility of at least about 35 wt. percent is especially useful for bonding to a light weight fibrous or foam web or board, such as a polymer fiber web. A method of making the mat by wet laying a slurry containing the fiber and the novolac resin particles and then further adding an aqueous solution or slurry containing a crosslinking agent for the novolac resin and a laminate containing the fiber glass mat are disclosed.

8 Claims, No Drawings

FIBER GLASS MAT

The present invention involves mats having particular use in bonding to fibrous webs and boards and to foam boards for uses such as in making automotive parts like headliners or topliners, lightweight structural parts, and other laminates. The present invention also involves a method of making mats and laminates that contain one or more layers of the inventive mat. The mats produced according to this invention are useful as reinforcement and dimensional stabilizers for making a large number of inorganic, polymeric and/or natural fibrous web and foam laminate products.

BACKGROUND

It is known to use nonwoven fiber mats made with glass fibers and bonded with aqueous thermosetting resins, like urea formaldehyde or phenolic resole resins to make molded parts and laminates. It is also known to use a nonwoven fiber glass mat to laminate to polymeric foam such as polystyrene foam to act as stiffeners and stabilizers in the manufacture of automotive parts such as automobile head liners, as disclosed in U.S. Pat. No. 4,729,917. Products produced with foam laminates having one or two layers of nonwoven fiber glass mat with urea formaldehyde binder are affected by high humidity and high ambient temperature to cause an unpleasant odor and also to deteriorate the binder strength. Also, non-extendible mat, i. e. a mat bound with a resin binder that is fully cured, is relatively stiff and does not conform well to curves and complex curvature, such as three dimensional curvature, and still provide excellent rigidity or stiffness to the foam laminate.

It is also known to make nonwoven fiber glass mats by chopping dry strands of glass fibers bound together with a binder to form chopped strand, to collect the chopped strand on a moving conveyor in a random pattern, and to bond the chopped strand together at their crossings by dusting a dry, powdered thermoplastic binder like a polyamide, polyester or ethylene vinyl acetate on wetted chopped strands followed by drying and curing the binder, as disclosed in U.S. Pat. No. 5,565,049. While such mat products are very useful including bonding to a layer of polymeric foam to stiffen the foam, these mats do not have as high a tensile strength as desired, and as achieved with a wet laid nonwoven fiber glass mat, because the bundles or chopped strands in the mat, according to the invention of the above cited patent, do not bond together as well as the individual fibers in a typical nonwoven mat. For example, the average sum of the machine direction tensile and the cross machine direction tensile for a chopped fiber glass strand mat made in this manner and having a basis weight of about 1.88 pounds per 100 sq. ft. is about 24 lbs. per 3 inch width compared to at least twice this tensile for wet laid nonwoven fiber glass mats. Mats made according to the above patented process also are more expensive to make than a typical nonwoven mat made with known wet laid processes.

It is also known to make a nonwoven fiber glass mat bonded with "B" staged acrylic resin having a glass transition temperature above 45 degrees C. and to use such mats to form a laminate with a foam layer for use in automotive head liners as disclosed in U.S. Pat. No. 6,008,147, but this mat is not well suited for laminating to a polymeric fibrous web when the desired shape contains complex curvatures requiring the mat to stretch substantially during molding. Further, it is known to use an acrylic copolymer latex, such as a self-crosslinking acrylic copolymer of an anionic emulsifying type as one component of at least a two component binder for bonding glass fibers and particulate thermoplastic to make a glass fiber reinforced sheet that can later be hot molded into various shapes and articles, as disclosed in U.S. Pat. No. 5,393,379.

Finally, it is known to make stampable, moldable, sheets of fiber glass reinforced thermoplastic by forming a dilute aqueous slurry containing glass fibers and thermoplastic particles or thermosetting particles smaller than 1 millimeter in size and passing the slurry through a moving forming screen to form the sheet and drying the sheet at a temperature high enough to bond the plastic particles together while retaining the particulate shape of the plastic particles, as disclosed in European Patent Specification 148,760. A conventional aqueous binder is applied to the wet formed mat of fibers and plastic particles when a mat intended for cutting and press molding is made. The added aqueous binder provides the strength in the dry mat needed to withstand handling in the cutting and press molding operations.

European Patent Application 148,761 and U.S. Pat. No. 4,690,860 also teach similar methods and mats as taught by European Patent Specification 148,760. U.S. Pat. No. 4,690,860 teaches inpregnating a stampable sheet containing glass fibers and a thermoplastic binder with a liquid thermosetting plastics material like liquid phenol formaldehyde or liquid melamine formaldehyde resin and then molding the sheet at elevated temperature and pressure to form a molded product that retains its hardness over a wider range of temperatures. This reference also suggests using powdered thermosetting resins like those used for in-mold coating of known art, but does not suggest forming a fibrous non-woven containing a novolac resin bonding the crossing fibers together throughout the mat. Sheets or mats made according to these disclosures are not sufficiently rigid or heat and sag, resistant for certain applications like automotive headliners because they contain a 40–60 percent of thermoplastic material and do not have a thermosetting matrix throughout the mat.

SUMMARY OF THE INVENTION

The present invention includes a fibrous nonwoven mat for laminating to other mats of the same or similar composition, to mats of different composition and to various other materials such as wood, a polymeric fiber web, fiber glass wool or mineral fiber webs or boards, foam boards, etc. comprising dispersed and crossing glass fibers bound together with a substantially melted Novolac resin having a solubility in acetone of at least about 35 weight percent, preferably at least about 50% and most preferably at least about 70% to about 90 or 95 percent such as about 85%, the Novolac resin preferably being a phenolic or epoxy Novolac resin. The mat also contains a crosslinking or hardening agent like hexamethylene tetramine. A Novalac resin as used herein is a product of partially polymerized first stage phenol or epoxy containing less than a stoichiometric amount of a crosslinking agent such as formaldehyde, amine, or other known crosslinking agent or agents. Novolac resins are well known in the art and normally are available as a powdered resin. Preferably the novolac resin is present in the finished mat in amounts of 10–60 weight percent based on the weight of the dry mat, more preferably 45–55 wt. percent, and most preferably about 48–52 wt. percent. The novolac particles should be of a size range that allow all or most of the particles to become entrapped in the mat is the mat is being formed. When one inch long M glass fiber is used, the preferred particle size of the novolac is minus 40 mesh to plus 100 mesh (U.S. Std.).

The invention also includes a method of making the nonwoven mat described above comprising dispersing glass fibers and Novolac powder in an aqueous slurry, collecting the dispersed fibers onto a moving permeable support to form a wet, fibrous, nonwoven mat, saturating the wet mat with an aqueous solution of slurry containing a crosslinking, hardening agent for the novolac resin, removing excess water and hardening agent from the wet, nonwoven mat and drying and heating the mat in a temperature and time environment that will melt the Novolac powder forming bonds where the fibers cross each other, but not thermoset the resulting Novolac resin bonds.

The present invention also includes molded laminates containing the mat of the present invention on at least one surface of a polymeric, inorganic or natural fibrous web or board or foam core. The fibrous web preferably can be a spun bonded, meltblown or a carded, lapped and needled web of organic polymer or natural fiber.

The mats of the present invention preferably have bundles of incompletely dispersed fibers in which the fibers are preferably at least 0.75 inch long and most preferably at least 1 inch long. The mats can also contain pigments, dyes, flame retardants, and other additives so long as they do not significantly reduce the ability of the mat to bond to a foam surface. The pigments or other additives can be included in the fiber slurry, the aqueous crosslinking solution or can be sprayed or otherwise coated onto the mat later using known techniques.

DETAILED DESCRIPTION OF THE INVENTION

It is known to make reinforcing nonwoven mats from glass fibers and to use these mats as substrates in the manufacture of a large number of roofing and other products. Any known method of making nonwoven mats can be used, such as the conventional wet laid processes described in U.S. Pat. Nos. 4,129,674, 4,112,174, 4,681,802, 4,810,576, and 5,484,653, the disclosures of each being hereby incorporated herein by reference. In these processes a slurry of glass fiber is made by adding glass fiber to a typical white water in a pulper to disperse the fiber in the white water forming a slurry having a fiber concentration of about 0.2–1.0 weight percent, metering the slurry into a flow of white water to dilute the fiber concentration to about 0.1 wt. percent or below, and depositing this mixture onto a moving screen forming wire to dewater and form a wet nonwoven fibrous mat. Usually an aqueous binder is then applied to the mat such as with a curtain coater and the excess binder is removed by a vacuum knife and the resultant wet mat is dried in an oven which heats the mat to a temperature high enough to cure the binder. This known process, with modifications as will be described, is used in the present invention. Alternative forming methods for making the mat include the use of well known paper or board making processes such as cylinder forming, etc. and probably even "dry laying" using carding or random fiber distribution.

The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer™ manufactured by Voith—Sulzer of Appleton, WS, or a Deltaformer™ manufactured by North County Engineers of Glenns Falls, N.Y.

The slurry used in the above mat forming process contains fibers, preferably glass fibers making up all or most of the fibers, and a Novolac powdered resin, preferably phenolic Novolac. The particle size should be such that most to all of the particles will be entrapped in the mat during forming and not be migrated or washed out of the mat with the whitewater or aqueous crosslinking agent as these liquids flow through or out of the partially or fully formed mat.

The length and diameter of the glass fibers can be selected based on the intended application and desired properties, but for use in the headliner laminates disclosed herein, the preferred size of the glass fibers will be one inch long with an average fiber diameter of about 16 microns. For headliner mat, at least some fibers longer than one inch may prove to be better than one inch long. Any type of glass fiber can be used, but E glass is most plentiful and is preferred for the headliner application. Generally, the greater the fiber diameter and the longer length of the fibers, the stiffer will be the resultant mat and vice versa.

It has been found that when the fibers selected for the mat are one inch long, and about sixteen micron diameter E glass fibers, the preferred particle size of the Novolac is minus 40 mesh to plus 100 mesh (U.S. Standard screens) or about 149–420 microns. If the particles are much coarser than minus 40 mesh, they will tend to form lumps in or on top of the mat, and if much finer than plus 100 mesh, insufficient Novolac powder will remain in the mat. Where shorter or smaller diameter fibers are used in substantial amounts, novolac particles smaller than 149 microns can be used and accordingly, where longer or larger diameter fibers are used in substantial amounts, novolac particles larger than 149 microns must be used and some particles larger than 420 microns can be used.

Preferably, for a mat for an automotive headliner product, enough Novolac particles are added to the whitewater slurry to produce a mat containing about 45 weight percent Novolac resin in the finished dry mat. The preferred phenolic powder is available from Georgia Pacific of Atlanta, Ga., as 2026 Grade. Mats of the present invention preferably contain about 10–60 weight percent novolac with about 45–55 wt. percent being preferred and about 48–52 wt. percent being most preferred.

Phenolic Novolac resins are described in a book entitled REINHOLD PLASTICS APPLICATIONS SERIES—PHENOLIC RESINS, by David F. Gould, published by Reinhold Publishing Corporation of New York, pages 31–33 as a crosslinking agent starved, insoluble, fusible resin made by using less than a stoichiometric amount of crosslinking agent in the condensing step, such as 0.9 mole of formaldehyde per 1 mole of phenol where the condensing step takes place in an acidic medium. Novolac resins are well known, are generally quite stable and are thermoplastic, but are generally too brittle to be of practical use and serve almost entirely as intermediates for the production of thermosetting resins. Novolac powders can be white, pink, yellow or tan in color. Properties of novolac resin include a melting point of about 85–95 degrees C., free phenol about 8–11 percent, and inclined plate flow of about 15–16 millimeters.

Hexamethylene tetramine (HMT) is a known crosslinking, hardening, agent and is preferred, but other known hardening agents can be used. The HMT or other hardening agent is preferably added to the mat as an aqueous solution in a post addition to a wet web of fibers and novolac resin particles. Suitable additions of HMT to the mat as the mat enters the oven include about 3–5 wt. percent based on the dry weight of the mat or about 7–10 wt. percent based on the weight of novolac resin in the mat. Greater amounts of hardening agent can be present, but is unecessary and increases the cost of the mat. If less than about 3 percent is used, the novolac will not fully cure to a thermoset resin when the mat is molded under heat and pressure to form a laminate. The HMT concentration in the solution can vary greatly, but concentrations of 10, 15 and 25 wt. percents have been used successfully.

The wet nonwoven mat of glass fiber is then transferred to a second moving screen and run through a saturating station, preferably using a conventional curtain coater, where an aqueous crosslinking agent is applied to the mat in any one of several known ways. The saturated mat is then run over one or more suction knives in a known manner while still on the moving screen to remove excess aqueous crosslinking agent solution. The preferred crosslinking agent for phenolic Novalac is hexamethylene tetramine, but other known crosslinking agents like paraformaldehyde can also be used.

The wet mat is then transferred to a wire mesh moving oven belt or honeycomb drum and run through an oven to dry the wet mat and to melt or substantially melt the novolac powder sufficiently to flow into and around the places where the fibers contact and/or cross one another in close proximity to bond the fibers together in the mat. When using phenolic vovolac powder, such as Georgia Pacific Corporation's GP-2026, the preferred maximum oven temperature is about 149 degrees C. (300 degrees F.), but this can be varied some as the time at temperature is varied to accomplish the disclosed objective. The novolac in the finished dry mat should be mostly soluble in acetone, indicating a very low level of crosslinking or cure, but not completely soluble. The most preferred novolac solubility of the partially cured resin in the mat in acetone is at least about 70 wt. percent, such as about 85 wt. percent, but can be in the range of about 35 to about 90 or 95 wt. percent. It is very important that the acetone solubility of the mat be no less than about 35, preferably no less than about 50 wt. percent. The lower the acetone solubility, the less flexible the mat for later molding, i.e. if too stiff, the mat won't drape or form complex curved shapes properly.

The majority of the fibers are glass fibers and preferably all the fibers are glass fibers. The glass fibers should be at least 0.75 inch long or longer, more preferably at least one inch long and can be longer such as about 1.25 or 1.5 inches long or longer. For other uses than use disclosed in detail herein, the fibers can be shorter than 0.75 inch. The glass fibers can have various fiber diameters dependent on the strength and other properties desired in the mat as is well known, but since the mat is intended to be relatively stiff, fibers having a diameter of at least 13 microns are preferred and at least 15 micron is more preferred, such as M fiber which has an average fiber diameter of about 15.5–16.5 microns. It is preferred that the fibers be coated with an amino or ureido silane containing size composition which are well known and readily available from fiber glass manufacturers.

It is preferred that the length of the chopped strands of glass fiber be such that when the chopped strand is added to the wet mat machine in the stock preparation section the fiber does not completely disperse, leaving some multi-fiber bundles in the stock. These bundles, much smaller in numbers of fibers and bundle size than the chopped strand used in the prior art as discussed earlier, are beneficial to the stiffness of the present mat product and its stiffening performance when laminated to foam. This is accomplished in normal whitewater with a fiber length of at least 1 inch and most preferably at least 1.25 inch. The skilled artisan will recognize that this can also be accomplished with shorter fiber by modifying the whitewater in known ways to reduce dispersion effectiveness, reducing agitation and/or time in the pulper and the stock tank or a combination of these. The preferred fibers are M or K 137 and K or M 117 E glass fibers available from Johns Manville International, Inc. of Denver, Colo., but most any commercially wet chop glass fiber product will be suitable. While the majority of the fibers are glass fibers, a minor portion of non-glass fibers can also be used, such as man made or natural organic fibers like Nylon™, polyester, polyethylene, polypropylene, cellulose or cellulose derivatives, etc.

The basis weight of the mat will depend upon the specific application. For stiffening polymeric fibrous webs for use in automotive headliners, the preferred basis weight of the dry mat for molding with a polyester fiber web to make automotive headliners is about 4.75 pounds per 100 square feet with the glass fibers constituting about 2.75 pounds per 100 square feet, but basis weights of about 2.25–4 pounds per 100 square feet, particularly 2.25–3 pounds per 100 square feet, should also be suitable for this application and basis weights as low as 1.2 lbs. per 100 square feet are effective for greatly increasing the strength and modulus of fiber glass wool boards and foam boards. The basis weight can be decreased or increased, depending upon the desirable rigidity and strength in the laminate. Basis weights as low as 0.5 pounds per 100 square feet can be rolled up at the end of the mat machine and later cut and handled for use. The maximum weight would be determined by the capability of the wet mat forming line and/or oven. Typically, for use in making laminates for automotive headliners, the glass fiber content of the mat is in the range of 40–60 wt. percent, preferably 45–55 wt. percent and most preferably about 50 wt. percent.

The mats of the present invention may be hot molded alone as one or more layers or hot molded in combination with other materials of all kinds suitable for molding. When the mats of the present invention are used on one or both surfaces of one or more layers of other material and hot molded, the resulting laminate will have a rigid surface with the remainder of the laminate having the properties of the other material or materials used. When the mats of the present invention are used as one or more interior layers, the interior of the laminate will be rigid and the surface or surfaces will have the properties of the other material or materials used.

Hot molding is well known and it is also well known to preheat the mats or laminate precursor sandwich to reduce molding time. When hot molding mat of the present invention to a three dimensional shape, it is preferred to first heat the inventive mat layer(s) to a temperature sufficient to soften or melt the novolac resin in the mat before deforming to the desired shape, either in the mold or before entering the mold, then molding to the desired shape and further heating to a sufficient temperature to react the hardening agent with the novolac to crosslink and form a thermoset bond in the resin in the mat(s) of the laminate. When a phenolic novolac is used in the mat a final temperature of about 193 degrees C. (380 degrees F.) for about 1 minute is satisfactory. Higher final temperatures will shorten the time required to reach complete cure, but can darken the novolac color if too high.

EXAMPLE 1

A fiber slurry was prepared by adding one inch long wet M 117 E type glass wet chopped fiber from Johns Manville International, Inc. of Denver, Colo., having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. Enough novolac powdered resin, Grade 2026 from Georgia Pacific, was added to the slurry to produce a novolac content in the dry finished mat of 47.5 wt. percent. After allowing the slurry to agitate for about 5 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a Voith Hydroformer™ where a wet nonwoven mat was continuously formed in sufficient basis weight to produce a dry mat having a basis weight of about 4.4–4/5 pounds per 100 square feet.

The wet mat was continuously removed from the forming wire and transferred to an in-line Sandy Hill Curtain Coater where an aqueous solution of hexamethylene tetramine was applied in excess and the saturated mat was then run over a vacuum knife which removed the excess and left a sufficient quantity in the mat to produce a concentration of hexamethylene tetramine in the dry mat of about 3.5 wt. percent.

The wet mat was then transferred to an oven belt and carried through an oven to dry the mat and to heat the mat to a temperature of about 300 degrees F. for about 30 seconds to melt the resin binder, allowing it to flow into and around the fiber crossings to bond the fibers together.

The resultant mat had the following properties.

Thickness (mils)—69

Basis weight (lbs./100 sq. ft.)—4.7

Tensile Strength
    Machine direction (lbs/3 in.)—34
    Cross machine direction (lbs/3 in.)—31

Novolac solubility in acetone: 85 wt. percent

Mat emissions on curing at 193 degrees C. for 35 seconds (micrograms/gram of mat) Phenol—69.4 Formaldehyde—18.5 Ammonia—15.4

Mat emissions on curing at 193 degrees C. for 60 seconds (micrograms/gram of mat) Phenol—80 Formaldehyde—20.1 Ammonia—68.4

This mat was then placed on both sides of a web of dry laid, needled polyester fibers and this sandwich was then molded at about 193 degrees C. and just enough pressure to deform the sandwich into the shape of the hot mold, and allowed to set under pressure and temperature for one minute. The resultant molded composite or laminate had a stiffness much higher than prior art fiber glass mat and PET fiber laminates and of chopped strand mat and PET fiber laminates molded in the same manner as above. Under three point loading according to SAE Method J 949, the strength of the laminate made with Example 1 mat, as described above, withstood a peak force at failure of 20 Newtons, several Newtons higher than prior art headliner laminates. The strength of the dry laid and needled polyester fibers in this test prior to lamination had negligible strength that was too low to measure.

EXAMPLE 2

This mat was made in the same manner as the mat in Example 1 except that the wet mat, prior to saturation with HMT, contained, on a dry basis, 49 wt. percent of the GP 2606 novolac resin particles, and the wet mat entering the oven contained about 7 wt. percent HMT, based on the amount of novolac resin, with the remainder being one inch M117 glass fiber available from Johns Manville International, of Toledo, Ohio. The basis weight of the dried and partially cured mat was 6.7 lbs/100 sq. ft. This mat had the following properties:

Machine direction tensile strength—60 lbs. per 3 in.

Cross machine direction tensile—60 lbs. per 3 in.

When this mat was laminated as described in Example 1, the resultant laminate had a stiffness about 2–3 times that of the prior art resole phenolformaldehyde bonded chopped strand mat and polyester fiber web (described in Example 1) laminate.

EXAMPLES 3–5

These examples show the effect of different drying oven temperatures on the acetone solubility of the novolac resin in the partially cured mats. These mats were made in the same manner described in Example 1 except that the mat contained 47.5 wt. percent GP 2026 resin and the basis weight of the mats ranged between 4.6 and 4.7 lbs./100 sq. ft. Example 3 was dried and treated at 300 degrees F., Example 4 at 325 degrees F. and Example 5 at 350 degrees F., all for about 30 seconds, to produce a range of acetone solubilities in the partially cured mats. The properties are shown in the following Table.

TABLE

|  | Example 3 | Example 4 | Example 5 |
| --- | --- | --- | --- |
| Basis Weight (lbs./100 sq. ft.) | 4.6 | 4.7 | 4.7 |
| Thickness (mils) | 70 | 69 | 73 |
| Machine Tensile (lbs/3 inch) | 26 | 65 | 140 |
| Cross Machine Tensile (lbs/3 inch) | 36 | 50 | 143 |
| Acetone solubility (% wt. loss) | 43.5 | 33.9 | 16.7 |

These mats were molded in the method described in Example 1 and the mat of Example 3 was suitable for making laminates of various types including laminates for automotive headliners. However, mats with acetone solubility of less than about 35 wt. percent, based on the weight of the novolac resin in the mat could not be molded since the phenolic formaldehyde (novolac) resin bonding the fibers together was cured too much to flow at high temperatures.

EXAMPLE 6

A mat was made using the procedure described in Example 1 except that the novolac resin content was 25 wt. percent and a much lighter weight mat having a basis weight of 1.7 lbs./100 sq. ft. was produced. This mat was then laminated to two faces of a foam board and to a fiber glass wool board producing laminates having the following properties:

|  | Mat/Foam board | Mat/FG wool board |
| --- | --- | --- |
| Peak strength (Newtons) | 12.5 | 67 |
| Modulus of Rupture (MPa) | 530 | 3245 |

The modulus of rupture of the foam board itself was too low to measure. The strength of the FG wool board alone was 27 newtons and the modulus of rupture of the FG wool board alone was 328 MPa. Thus, even relatively light weight mats of the present invention produces substantial strength improvement to light weight boards.

The mat and laminates of the present invention have further advantages over the prior art products. These include a substantially lower level of formaldehyde emissions during molding than when using prior art mats bonded with resole resins like "B" staged phenolic resin and a lower cost compared to mats containing chopped strand to produce acceptable modulus of failure.

Numerous modifications can be made to the preferred embodiment disclosed in the examples. One can modify the amount of novolac and the basis weight to achieve the desired level of moldability and strength in the molded laminate. Various known pigments, fillers, and other known additives can be incorporated into the mat by addition to either the whitewater or to the aqueous crosslinking solution or slurry for the function they are known to provide.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

While the preferred embodiments of the invention have been disclosed in detail, other embodiments within the described invention and having other functional additives known or obvious to those skilled in the art are considered to be part of the present invention and are intended to be included in the invention claimed below.

I claim:

1. A wet-formed, nonwoven fiber mat comprising glass fibers bonded together at the locations where the fibers cross each other with up to about 60 weight percent, based on the dry weight of the mat, of novolac resin, said resin having an acetone solubility of at least 35 wt. percent, and at least about 3 weight percent hardening agent for said resin based on the weight of the mat, said hardening agent amounting to at least about 7 weight percent of the weight of the novolac resin, said novolac resin being substantially in melted form bonding the fibers together.

2. The mat of claim 1 wherein the hardening agent is hexamethylene tetramine (HMT).

3. The mat of claim 1 wherein the glass fibers in the mat are about one inch long and wherein the glass fibers make up about 90–40 wt. percent of the mat and the novolac resin makes up at least 10 wt. percent of the mat.

4. The mat of claim 1 wherein said mat contains about 45–55 wt. percent of novolac resin having a particle size of about minus 40 mesh and plus 100 mesh and the acetone solubility of the resin binder is at least about 70 wt. percent.

5. The mat of claim 2 wherein said mat contains about 45–55 wt. percent of novolac resin having a particle size of about minus 40 mesh and plus 100 mesh and the acetone solubility of the resin binder is at least about 70 wt. percent.

6. The mat of claim 3 wherein said mat contains about 45–55 wt. percent of novolac resin having a particle size of about minus 40 mesh and plus 100 mesh and the acetone solubility of the resin binder is at least about 70 wt. percent.

7. The mat of claim 1 wherein said mat contains about 48–52 wt. percent of novolac resin having a particle size of about minus 40 mesh to plus 100 mesh and the acetone solubility of the resin binder is at least about 85 wt. percent.

8. The mat of claim 1 wherein the acetone solubility of the novolac resin is at least 45 wt. percent.

* * * * *